(12) United States Patent
Jiang

(10) Patent No.: US 11,063,286 B2
(45) Date of Patent: Jul. 13, 2021

(54) TIN-IODATE RECHARGEABLE BATTERY

(71) Applicant: Yun Jiang, Toronto (CA)

(72) Inventor: Yun Jiang, Toronto (CA)

( * ) Notice: Subject to any disclaimer, the term of this patent is extended or adjusted under 35 U.S.C. 154(b) by 98 days.

(21) Appl. No.: 16/708,870

(22) Filed: Dec. 10, 2019

(65) Prior Publication Data

US 2021/0091399 A1     Mar. 25, 2021

(30) Foreign Application Priority Data

Sep. 25, 2019   (CN) .......................... 2019108975125

(51) Int. Cl.
| | |
|---|---|
| *H01M 8/18* | (2006.01) |
| *H01M 4/36* | (2006.01) |
| *H01M 4/38* | (2006.01) |
| *H01M 4/583* | (2010.01) |
| *H01M 8/08* | (2016.01) |

(52) U.S. Cl.
CPC .......... *H01M 8/188* (2013.01); *H01M 4/368* (2013.01); *H01M 4/387* (2013.01); *H01M 4/583* (2013.01); *H01M 8/08* (2013.01); *H01M 2300/0005* (2013.01)

(58) Field of Classification Search
CPC ...... H01M 8/188; H01M 4/368; H01M 4/387; H01M 4/583; H01M 8/08; H01M 2300/0005
See application file for complete search history.

(56) References Cited

U.S. PATENT DOCUMENTS

| | | | | |
|---|---|---|---|---|
| 10,199,672 | B2 * | 2/2019 | Dong | H01M 8/188 |
| 10,290,889 | B2 * | 5/2019 | Kaku | H01M 8/08 |
| 10,615,441 | B2 * | 4/2020 | Kaku | H01M 8/188 |
| 2019/0312269 | A1 * | 10/2019 | Treger | H01M 6/181 |

\* cited by examiner

*Primary Examiner* — Stewart A Fraser

(57) ABSTRACT

The present invention discloses a rechargeable tin-iodate battery, including static battery and redox flow battery, in which anodic tin will be dissolved as $Sn^{2+}$ and $Sn^{4+}$ ions while iodate will be reduced to iodine and iodide at carbon cathode during discharging. The process will be reversed in charging. The tin-iodate battery comprises a tin anode (1), a carbon cathode (2), a selective permeable separator (3), and aqueous acidic electrolytes, whereby electricity energy can stored with high energy density and high power density, and large-scale energy storage and electrified vehicle can be achieved.

10 Claims, 2 Drawing Sheets

TIN-IODATE RECHARGEABLE BATTERY

FIELD OF THE INVENTION

The present invention relates to electrochemical energy storage devices and in particular to the batteries which contain tin and iodate redox reactions in aqueous electrolyte.

BACKGROUND OF THE INVENTION

There is ever increasing demand of advanced battery technologies with high safety and low cost for applications in electrified vehicles and large-scale renewable energy storage. The current commercialized rechargeable batteries, such as Lead-acid battery, display low energy density and environmental unfriendliness with toxic electrode materials. Therefore, Li-ion batteries arrest much attention in recent years. However, although lithium-ion batteries have gained great improvement in energy/power density and life span, the safety issues associated with flammable organic electrolytes and the growing concerns of the high cost and availability of Li resources impede their large-scale deployment. Numerous Li-ion battery accidents causing fires and explosions have been reported. Li-ion batteries are too expensive for large-scale stationary energy storage of the sustainable energy sources, such as solar energy, wind energy, etc.

Unlike traditional batteries, flow-based electrochemical energy storage system separate the energy storage and power generation by storing the electro-active species in externally flowing electrolytes, while maintaining the redox reactions at the electrode surface inside a stack. This unique architecture permits the flow batteries to independently scale the power and energy, enable high safety for intermittent renewable energy integration and other grid services. However, despite continuous progress, the energy density of traditional flow batteries is considerably lower than that of low-end Li-ion batteries. The most promising all-vanadium redox battery is limited to <25 Wh/l by the low solubility of the active species. Improvement in energy density is a necessity to enable the flow battery for applications such as stationary energy storage and electric vehicles.

The purpose of this patent is to invent a new tin-iodate rechargeable battery to meet the demand for the high performance characteristics that include high power, high energy, high reliability and safety, longer life, as well as low cost and environmentally benign.

SUMMARY OF THE INVENTION

It is, therefore, an object of the present invention to provide a rechargeable electrochemical battery with high power density, high energy density, high reliability and safety, longer life, as well as low cost and environmentally benign.

This object is achieved in accordance with the present invention by providing an electrochemical tin-iodate battery with a tin anode, a carbon cathode, a selective permeable separator for separating anodic electrolyte and cathodic electrolyte, acidic aqueous electrolytes.

The said tin anode comprises tin (such as metal tin, tin alloy, a compressed mixture of tin or tin alloy particles with electrically conductive particles and a binder, with or without anticorrosion agents) or carbon (such as graphite felt, carbon felt, carbon cloth, carbon paper, carbon fibre, graphite paper, graphite paper).

The said carbon cathode comprises carbon (carbon fibre, carbon felt, carbon foam, graphite felt, carbon cloth, carbon paper, graphite paper or a compressed mixture of carbon particles with electrically conductive particles and a binder, etc.).

The said selective permeable separator can be a combination of proton exchange membrane, ion exchange membrane, reverse osmosis (RO) membrane, nanofiltration (NF) membrane, semi permeable membrane, or glass paper, which separates the electrolytes and only allows $H^+$ to permeate but blocks other ions to cross over.

The said selective permeable separator can be one layer of membrane or a device with multiple membranes.

The said acidic aqueous electrolyte includes anodic stannous electrolyte and cathodic iodic electrolyte.

The said anodic stannous electrolyte comprises at least one of acids, such as sulfuric acid, muriatic acid, nitric acid, sulfamic acid, phosphoric acid, hydrobromic acid, hydriodic acid, acetic acid, citric acid, with or without stannous salt.

The said cathodic iodic electrolyte comprises at least one of iodate, iodide, iodine, iodic acid.

The said tin-iodate battery can be static battery or redox flow battery. Flow battery is preferred for large-scale energy storage and electrified vehicles.

BRIEF DESCRIPTION OF THE DRAWINGS

The invention may be more readily understood by reference to the following drawing wherein.

DETAILED DESCRIPTION OF THE INVENTION

The invention discloses a rechargeable tin-iodate battery which comprises a tin anode, a carbon cathode, a selective separator, and acidic electrolytes.

Figure 1:
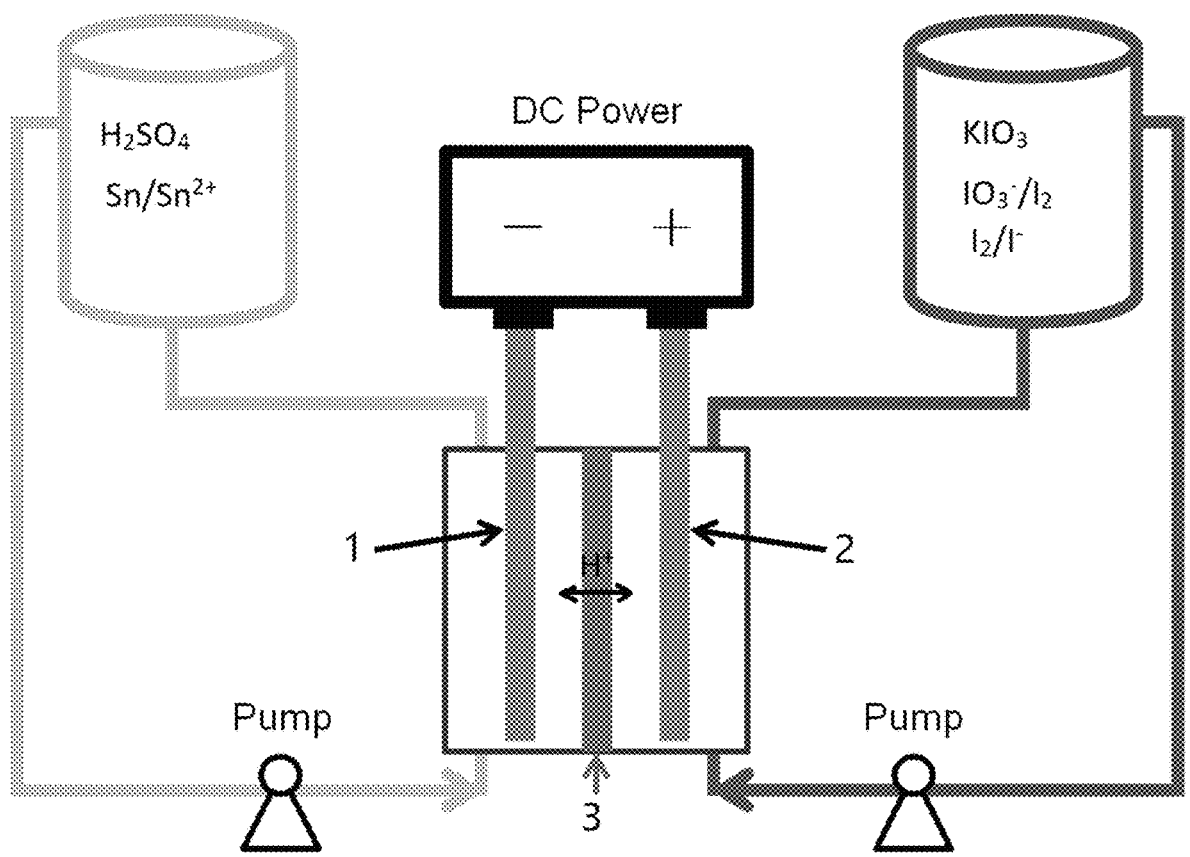
FIG. 1 Tin-iodate rechargeable flow battery

As shown in FIG. 1, in a preferred embodiment, the anode 1 is tin and the cathode 2 is carbon fiber. The anodic stannous electrolyte is sulfuric acid and the cathodic iodic electrolyte is potassium iodate solution. The separator 3 is proton exchange membrane Nafion N115. A tin-iodate battery is thus constructed based on the following redox reactions:

| Anode: | $3Sn - 6e^- \leftrightarrow 3Sn^{2+}$ | $E^0 = -0.13$ V |
|---|---|---|
| | $3Sn^{2+} - 6e^- \leftrightarrow 3Sn^{4+}$ | $E^0 = 0.15$ V |
| Cathode: | $2IO_3^- + 12H^+ + 10e^- \leftrightarrow I_2 + 6H_2O$ | $E^0 = 1.20$ V |
| | $I_2 + 2e^- \leftrightarrow 2I^-$ | $E^0 = 0.54$ V |
| Overall: | $3Sn + 12H^+ + 2IO_3^- \leftrightarrow 3Sn^{4+} + 2I^- + 6H_2O$ | $E = 1.33/0.39$ V |

The protons in the anodic electrolyte penetrate the selective permeable separator 3 to enter the cathodic electrolyte and participate in the electrochemical reaction during discharging process. Anion such as $IO_3^-$ and $I^-$ including iodine cannot cross over the proton exchange membrane. During the charging process, the protons return anodic electrolyte while iodide ions and iodine are oxidized to iodate with the help of catalysts. The stable open-circuit voltage is 1.55 V, high than the standard electrode potential 1.33 V.

The electrolytes can also start from stannous solution and iodide/iodine solution, without departing from the scope of the present invention. The selective separator can be one layer of membrane or multiple layers of different membrane to specifically only allow proton to cross over.

Figure 2:
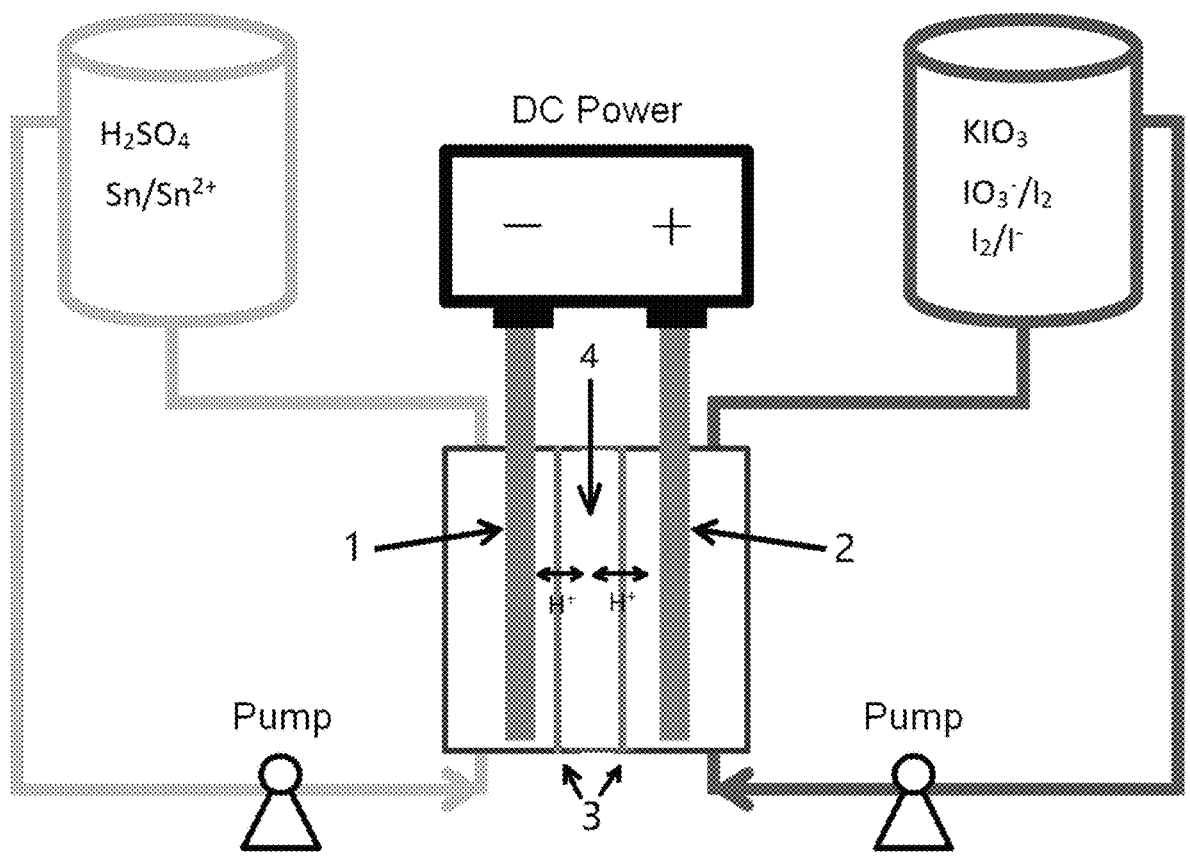
FIG. 2 Tin-iodate rechargeable flow battery with two separates and intermediate electrolyte The referenced drawing is only for the purpose of illustrated embodiments, and is not to be construed as limiting the present invention.

FIG. 2 shows another preferred embodiment with two separators 3. Between the separators 3 is intermediate electrolyte 4. The device with separators 3 and intermediate electrolyte 4 separates the anodic electrolyte and cathodic electrolyte.

Tin has very low negative standard electrode potential, thus was not preferred in anode material selection in previous studies. However, iodate has high energy density and high water solubility but requires very acidic environment. Only tin could endure such an acidic environment. In order to use iodate, tin has to be used as anode. The good news is the actual open-circuit voltage 1.55 V is higher than expected, and the high solubility of stannous salt in acidic solution results in high energy density of the battery.

The energy density is usually measured as the amount of energy stored per unit weight of reactive redox species and can be calculated by the concentration of active species and voltage in the form of equation:

$$E = \frac{NFV}{m}$$

where N is the number of electrons involved in the redox reaction, here is 12, F is the Faraday constant (26.8 Ah mol$^{-1}$), V is the voltage, m is the total mass of active species including solvent water, which depends on the solubility of active redox species. Thus the theoretical energy density of the tin-iodate battery can be calculated as 183 Wh/kg or 319 Wh/L. Practically 95 Wh/kg or 191 Wh/L can be achieved. This energy density is much higher than the commercialized traditional Lead-acid battery (30 Wh/kg) and vanadium redox flow battery (25-30 Wh/kg, 25 Wh/L), and is comparable with the low end of Li-ion battery (100-265 Wh/kg).

Experiments prove that the tin-iodate battery can discharge and be charged quickly at 350 mA/cm$^2$ with high power density. There are no problems of dendrite, over charge and over-discharge. Metal tin is so soft that the tin plating cannot break the separator membrane. Both tin and iodine are low toxic, renewable and reusable and the aqueous solution is inflammable, which make the system very safe and environmental friendly. Finally, the costs of tin and iodate are low as well. All the performance characteristics make the tin-iodate battery almost perfect for large-scale energy storage and electrified vehicles.

Although the invention has been described in detail for the purpose of illustration based on the currently considered embodiment, it is to be understood that such detail is solely for that purpose and that the invention is not limited to the disclosed embodiment, but, on the contrary, is intended to cover modifications and equivalent arrangements that are within the spirit and scope of claims.

What is claimed is:

1. A rechargeable tin-iodate battery, including a static battery and a redox flow battery, comprising:
   a tin anode;
   a carbon cathode;
   a selective permeable separator for separating anodic stannous electrolyte and cathodic iodic electrolyte; and
   aqueous acidic electrolytes,
   whereby electricity energy can be stored.

2. The rechargeable tin-iodate battery of claim 1 is capable of the following redox reactions:

| Anode: | $3Sn - 6e^- \leftrightarrow 3Sn^{2+}$ | $E^0 = -0.13$ V |
| | $3Sn^{2+} - 6e^- \leftrightarrow 3Sn^{4+}$ | $E^0 = 0.15$ V |
| Cathode: | $2IO_3^- + 12H^+ + 10e^- \leftrightarrow I_2 + 6H_2O$ | $E^0 = 1.20$ V |
| | $I_2 + 2e^- \leftrightarrow 2I^-$ | $E^0 = 0.54$ V |
| Overall: | $3Sn + 12H^+ + 2IO_3^- \leftrightarrow 3Sn^{4+} + 2I^- + 6H_2O$. | $E = 1.33/0.39$ V |

3. The rechargeable tin-iodate battery of claim 1, wherein said tin anode comprises at least tin or carbon.

4. The rechargeable tin-iodate battery of claim 3, wherein said tin anode is capable of at least one of the following redox reactions:

$$3Sn - 6e^- \leftrightarrow 3Sn^{2+} \quad E^0 = -0.13 \text{ V}$$

$$3Sn^{2+} - 6e^- \leftrightarrow 3Sn^{4+} \quad E^0 = 0.15 \text{ V}.$$

5. The rechargeable tin-iodate battery of claim 1, wherein said carbon cathode comprises carbon.

6. The rechargeable tin-iodate battery of claim 5, wherein said carbon cathode is capable of the following redox reaction:

$$2IO_3^- + 12H^+ + 10e^- \leftrightarrow I_2 + 6H_2O \quad E^0 = 1.20 \text{ V}.$$

7. The rechargeable tin-iodate battery of claim 1, wherein said selective permeable separator comprises at least one layer of membrane or a device with multiple membranes to separate anodic electrolyte and cathodic electrolyte.

8. The rechargeable tin-iodate battery of claim 1, wherein said aqueous acidic electrolytes include anodic stannous electrolyte and cathodic iodic electrolyte.

9. The rechargeable tin-iodate battery of claim 8, wherein said anodic stannous electrolyte comprises at least one acid.

10. The rechargeable tin-iodate battery of claim 8, wherein said cathodic iodic electrolyte comprises at least one of iodate, iodide, iodine, iodic acid.

* * * * *